US007977626B2

(12) United States Patent
Hidalgo et al.

(10) Patent No.: US 7,977,626 B2
(45) Date of Patent: Jul. 12, 2011

(54) TIME OF FLIGHT MASS SPECTROMETRY METHOD AND APPARATUS

(75) Inventors: August Jon Hidalgo, San Francisco, CA (US); Bryan David Miller, Cupertino, CA (US); Gregor T. Overney, San Jose, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 206 days.

(21) Appl. No.: 11/763,021

(22) Filed: Jun. 14, 2007

(65) Prior Publication Data

US 2008/0296490 A1 Dec. 4, 2008

Related U.S. Application Data

(60) Provisional application No. 60/941,622, filed on Jun. 1, 2007.

(51) Int. Cl.
*B01D 59/44* (2006.01)

(52) U.S. Cl. ........ 250/282; 250/281; 250/286; 250/287; 702/22; 702/23; 702/27; 702/28; 702/31; 702/32

(58) Field of Classification Search .................. 250/281, 250/282, 286, 287; 702/22, 23, 27, 28, 31, 702/32
See application file for complete search history.

(56) References Cited

U.S. PATENT DOCUMENTS

| | | | | |
|---|---|---|---|---|
| 5,107,109 | A | 4/1992 | Stafford, Jr. et al. | |
| 5,559,325 | A | 9/1996 | Franzen | |
| 5,936,241 | A | 8/1999 | Franzen et al. | |
| 5,995,989 | A * | 11/1999 | Gedcke et al. | 708/300 |
| 6,600,154 | B1 | 7/2003 | Franzen et al. | |
| 6,680,476 | B1 * | 1/2004 | Hidalgo et al. | 250/286 |
| 6,744,040 | B2 * | 6/2004 | Park | 250/281 |
| 6,770,872 | B2 * | 8/2004 | Bateman et al. | 250/281 |
| 6,822,227 | B1 * | 11/2004 | Hidalgo et al. | 250/287 |
| 7,138,625 | B2 | 11/2006 | Overney et al. | |
| 7,345,275 | B2 * | 3/2008 | Amirav et al. | 250/282 |
| 2004/0079877 | A1 * | 4/2004 | Hidalgo et al. | 250/287 |
| 2004/0195500 | A1 * | 10/2004 | Sachs et al. | 250/282 |
| 2007/0034794 | A1 | 2/2007 | Cotter et al. | |
| 2007/0090285 | A1 | 4/2007 | Whitney et al. | |
| 2007/0114374 | A1 * | 5/2007 | Prest et al. | 250/282 |
| 2008/0001079 | A1 * | 1/2008 | Wang et al. | 250/282 |

OTHER PUBLICATIONS

Fung, et al., ("A simple and Inexpensive Approach to Interfacing High-Performance Liquid Chromatography and Matrix-Assisted Laser Desorption/Ionization—Time of Flight—Mass Spectrometry", Proteomics, vol. 4, pp. 3121-3127, 2004.).*
"An introduction to quadrupole-time-of-flight mass spectrometry" Journal of Mass Spectrometry, Igor V. Chernushevich et al. J. Mass Spectrom 2001; 36: 849-865.
"Time-of-Flight Mass Spectrometry" Technical Overview John Fjeldsted—Agilent Technologies Dec. 11, 2003, pp. 1-12.

(Continued)

*Primary Examiner* — Robert Kim
*Assistant Examiner* — Michael Maskell

(57) ABSTRACT

A method and apparatus for performing time of flight mass spectrometry wherein the number of sums of transients taken for generating a given spectra is determined as a function of a characteristic of the incoming data for that spectrum. For instance, the number of transient measurements taken for a given spectrum output can be determined as a function of the abundance of ions in the sample or the abundance of ions corresponding to a base peak or another selected peak. In yet another embodiment, the collection of transients is terminated when a threshold signal to noise ratio is attained.

24 Claims, 3 Drawing Sheets

OTHER PUBLICATIONS

"Status of complete proteome analysis by mass spectrometry: SILAC labeled yeast as a model system" Geome Biology 2006, vol. 7, issue 6, Article R50 Lyris MF de Godoy et al.

"Rapid Liquid Chromatography and Fast MS/MS Acquisition Enables High Throughput Protein Identification Workflows" Stephen Tate et al.; www.appliedbiosystems.com ; 2006; 4 pages.

* cited by examiner

TIME OF FLIGHT MASS SPECTROMETRY METHOD AND APPARATUS

RELATED APPLICATION

This application claims the benefit of provisional application No. 60/941,662 filed on Jun. 1, 2007, which is incorporated herein fully by reference.

FIELD OF THE INVENTION

The invention pertains to time of flight (TOF) mass spectrometry (MS).

BACKGROUND OF THE INVENTION

A mass spectrometer is a type of instrument that determines the mass-to-charge ratios of the ionized constituents of a sample. There are several different types of mass spectrometers. In a time-of-flight mass spectrometer (TOF MS), the sample to be analyzed is first ionized and then exposed to a voltage pulse that accelerates the ions through a vacuum along a path toward a detector. The lower the mass-to-charge ratio of the ion, the more it will accelerate and, therefore, the earlier it will arrive at the detector. Thus, a TOF MS segregates the ions liberated from the sample by mass-to-charge ratio based on their arrival time at the detector.

The detector converts the impacts of the ions on the detector into electrons. One or more ions may hit the detector at any given time. There is a statistical correlation between the number of ions hitting the detector and the number of electrons generated. The number of electrons leaving the detector in a given time interval is converted to a voltage that is digitized by an analog-to-digital converter (ADC).

The greater the mass-to-charge ratio of the ion, the longer the flight time to the detector. The relationship between the flight time and the mass-to-charge ratio can be written in the form:

$$\text{time}=k\sqrt{(m/z)}+c$$

where k is a constant related to flight path and ion energy, m is mass, z is charge, and c is a small delay time that may be introduced by the acceleration and/or detection electronics.

Thus, on average, the signal output from the ADC at any given instant is proportional to the number of ions reaching the detector at that instant. The delay for an ion to reach the detector (i.e., the time of flight to reach the detector after the acceleration pulse) is proportional to the square root of the mass-to-charge ratio of the ion. Hence, the output of the ADC can be processed to generate a plot (or spectrum) of the concentration of ions from the sample as a function of mass-to-charge ratio (hereinafter m/z). Specifically, the time of flight statistically correlates to the m/z of the ion and the number of ions hitting the detector at that instant correlates statistically to the relative concentration of ions ionized from the sample of that particular m/z. For purposes of digitally processing the detector data to generate a spectrum, the range of delay times is divided into discrete "bins" and the output of the ADC in each time bin is analyzed to generate a data point. The collection of these data points is used to generate the mass spectrum.

The mass resolution of the spectrometer depends in part on the time between the bins into which the flight time measurements are divided. The resolution as to concentration of the ions of a given m/z (i.e., dynamic range) depends in part on the resolution of the ADC output (i.e., the number of bits of output of the ADC).

Hence, the time of a peak in the spectrum corresponds to the m/z of the ions and the amplitude of that peak corresponds to the abundance (or concentration or number) of ions having that m/z.

Generally, the identity of the constituents of a sample can be accurately determined from TOF MS, especially with advance knowledge of what should be expected. Therefore, TOF MS can be used to determine the molecular constituents of a sample and the abundance or concentration of those constituents. However, it is conceivable that two different ions in a sample could have the same mass-to-charge ratio or at least that the difference between their mass-to-charge ratios is below the resolution of the system so that they are indistinguishable from each other by the TOF MS.

Typically, the amount of ions liberated by a single acceleration pulse and measured by the detector as discussed above (commonly referred to as a transient or transient response) is too small to provide a statistically accurate mass spectrum of the sample. Hence, the transient measurement is repeated a number of times (usually on the order of hundreds to tens of thousands) and the data from the multiple transients is combined (e.g., summed) to generate statistically relevant amounts of data at an acceptable signal-to-noise (S/N) ratio. The plurality of transients measured to generate a reported mass spectrum will sometimes hereinafter be referred to as a scan.

Generally, the lower the concentration of an analyte of interest, the greater the number of TOF MS sums (i.e., transients) needed to achieve a desired S/N ratio. Thus, the number of transients summed per spectrum (the number of transients per scan) usually is set as a function of the lowest expected abundance or concentration of an analyte of interest.

The time that must be permitted for each transient is a function of the highest m/z ion that might exist in the sample. Quite simply, the highest m/z ion in the sample will arrive at the latest time. The time provided for each transient measurement (i.e., the time between the voltage pulses that accelerate the ions) must be at least as long as it would take for the slowest-traveling ion to arrive at the detector.

A typical maximum allowed time of flight for a transient might be on the order of 100 microseconds or so. Thus, if we assume (1) a typical number of transients to obtain statistically relevant data, such as 10,000 transients, (2) a typical number of data points (i.e., time bins) per transient, such as 100,000, and (3) four bytes per data point to represent the number of ion impacts detected in each time bin, that results in a data rate of 4 gigabytes per second.

Transferring data to a processor at this rate is not possible at reasonable expense with current computer technology. Furthermore, the amount of memory capacity that would be necessary in a TOF MS to store this data for later, off-line processing also is not commercially practical. Therefore, rather than storing or processing the spectra resulting from each transient individually, the data from all of the transients is summed and only the sum is stored. When all of the transients have been processed, the sum is used to generate a single, consolidated mass spectrum.

Typically, in TOF MS, the output spectrum is a plot of concentration (or abundance or number of ions) on the vertical axis as function of time (which is correlated to $\sqrt{m/z}$) on the horizontal axis. A typical spectrum consists of a plurality of populations of ions of a given m/z, often referred to as mass peaks.

In addition, a TOF MS system often is a part of a larger system that couples the TOF MS instrument with another instrument that also time-segregates the sample to provide a second dimension of data in the ultimate output of the system.

For example, the sample introduced at the input end of a TOF MS might be the output of a gas or liquid chromatograph, a quadrupole mass filter, a collision cell, a MALDI (Matrix Assisted Laser Desorption Ionization) stage, or an ion trap mass spectrometer.

A gas or liquid chromatograph, for instance, may be placed before the TOF MS so as to provide a sample that has already been chemically separated as a function of time of arrival at the output of the chromatograph (i.e., at input to the TOF MS). The output of a chromatograph commonly might have peaks of analytes arriving at its output that are seconds to a few minutes wide separated by many minutes of background noise.

As another example, a quadrupole mass filter is an adjustable mass filter that can be set to allow ions within a particular m/z range to pass through. The time required for such filters to transition between m/z ranges could be on the order of microseconds to milliseconds. A collision cell may be further included between the quadrupole mass filter and the TOF MS analyzer. The optimal dwell time for integration of the TOF MS signal for a particular quadrupole filter m/z range setpoint is a function of the incoming ion signal intensity in that m/z range. Generally, this will be different for different m/z ranges and also typically will be time-variant.

In an exemplary MALDI stage, a sample of a chemical compound that is sensitive to laser light (the matrix) is hit with a pulse of laser light to superheat the sample to cause a portion of the sample to be desorbed and become ions. The optimal values for the number of times the sample is hit with the laser pulse, the duration of the pulse, the power of the pulse, how often the laser is moved to strike a new portion of the sample, and how long to integrate the data in the MALDI can depend on many factors. In turn, the duration of signals associated with ionized sample components in the output of the MALDI stage and the intervals between those signals can vary significantly.

In ion trap mass spectrometry, ions are captured in a storage device (trap) and mass-selectively ejected from the trap.

In all of the aforementioned potential preceding stages to a TOF MS, the output (which, of course, is the input to the TOF MS) is already separated by either chemical properties or mass as a function of time. Therefore, such combined systems can provide greater mass resolution, greater mass accuracy, greater component resolution, and greater concentration accuracy and/or resolution.

In such combined systems, the TOF MS stage generates a plurality of consecutive, time-separated mass spectra of the time-varying input sample in order to extract the most information from the sample.

DETAILED DESCRIPTION OF THE INVENTION

The invention pertains to time of flight mass spectrometry wherein the number of sums of transients taken to generate a mass spectrum of a sample is determined as a function of a characteristic of the combined data. For instance, the number of transient responses taken for a given spectrum can be determined as a function of the number (or abundance) of ions in the sample or the abundance of ions corresponding to a base peak or another selected peak. In yet another embodiment, the collection of transients is terminated when a threshold S/N ratio is attained.

In this manner, the amount of data being collected and processed to generate each spectrum can be optimized based on a current characteristic of the data. As an additional benefit, the time required to obtain a spectrum is reduced during the output peaks of the preceding stage and increased during the nulls between the peaks of the preceding stage output, where little or no useful data resides. This provides greater time resolution during the peaks output from the preceding stage and lower time resolution during the nulls where little or no useful data resides, resulting in more efficient use of available memory and/or processing resources.

Figure 1:
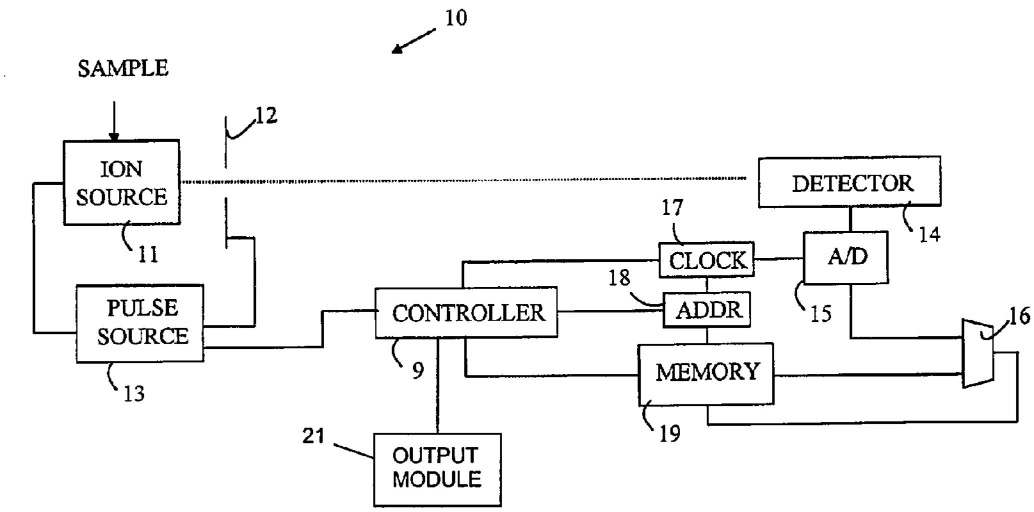
FIG. 1 is a block diagram of a time of flight mass spectrometer in accordance with one embodiment of the present invention.

FIG. 1 is a schematic drawing of a TOF MS 10 within which the principles of the present invention can be incorporated. A controller 9, which may, for instance, comprise a computer, a processor, a microprocessor, combinational logic, a state machine, digital circuitry, analog circuitry, or any and all combinations of the above, controls the TOF MS equipment in accordance with its programming or other operational configuration parameters. The sample to be analyzed is ionized and the resultant ions transported into an acceleration region 11. The ions are accelerated by applying a potential between the acceleration region 11 and one or more electrodes 12. At the beginning of each transient, controller 9 sends an appropriate control signal to a pulse source 13 to cause it to generate a short pulse applied between electrode 12 and acceleration region 11 that accelerates the ions in the acceleration region 11 toward an ion impact detector 14 such that, some time after the pulse is applied, the ions impact on the detector 14. Controller 9 also resets the address register 18 to address location zero at the time the pulse is generated.

On each clock cycle after the pulse is generated, an analog-to-digital converter (ADC) 15 digitizes the signal generated by detector 14 and outputs that into one input terminal of an adder 16. Also on each clock cycle after the pulse is generated, clock 17 increments an address register 18 by one address location.

The value stored in memory 19 at the address specified in address register 18 is applied to the second input terminal of adder 16 such that adder 16 adds the stored value to the value provided by ADC 15. The output terminal of adder 16 containing the summed value is then provided back to the memory 19 at the same address for storage.

As noted above, the time required by an ion to traverse the distance between electrode 12 and detector 14 is a measure of the m/z of the ion. This time is proportional to the value in address register 18 when the ion strikes the detector such that each address in the memory corresponds to a particular time bin. Furthermore, the number stored in each memory address at the end of a plurality of transient measurements is a summation of the ions that impacted the detector in that time bin for all of the previous transient measurements taken. Hence, memory 19 essentially stores a graph of the sum of the detector's outputs as a function of the time value, i.e., a mass spectrum.

When the designated number of transients have been collected and combined, the controller halts the collection of transients and, preferably, also signals an output module 21 to read out the data from memory 19 and format it into an appropriate form, such as a graph (see FIG. 2, discussed below). Although shown as a separate block, the output module 21 may be incorporated into the controller 9 or may be a separate processor, microprocessor, combinational logic circuit, analog circuit, etc. The output module 21 can then convey the graph to an output device, e.g., a computer monitor or printer.

As noted above, to provide reasonable statistical accuracy for the data, the number of transients combined to produce the data in memory 19 before generating a final spectrum is quite large (typically hundreds to tens of thousands). Each transient response requires a finite amount of time to produce and record, that time being at least as long as it would take the highest m/z ion of interest to travel to the detector, e.g., 100 microseconds. Thus, if each transient requires, for instance, 100 microseconds to measure and 10,000 transients are collected, it would take one second to generate each mass spectrum (or scan).

On the other hand, it is desired to generate each spectrum in as short an amount of time as possible to assure the accuracy and usefulness of the collected data. For instance, MS systems are extremely sensitive such that slight changes in the operating conditions of the equipment can skew the results. Temperature drift, fluctuations in the voltage level that accelerates the ions, and fluctuations in ion generation can alter the results. Furthermore, when the input sample itself has been pre-processed by another separation stage, such as a chromatograph, quadrupole filter, MALDI (Matrix Assisted Laser Desorption Ionization) or ion trap mass spectrometer, the input sample itself typically is changing as a function of time, and for both qualitative and quantitative characterizations, it is important to accurately capture the time-variant profiles of as many of the total sample components as possible. Therefore, minimizing the time required to generate a spectrum maximizes the probability of detecting transiently present components in the sample. Accordingly, it is advantageous to minimize the time required to obtain a particular mass spectrum.

However, it is desirable that any reduction in the spectral acquisition time not be made at the expense of the mass accuracy, mass resolution, abundance resolution, or signal to noise ratio of the measurements.

Figure 2:
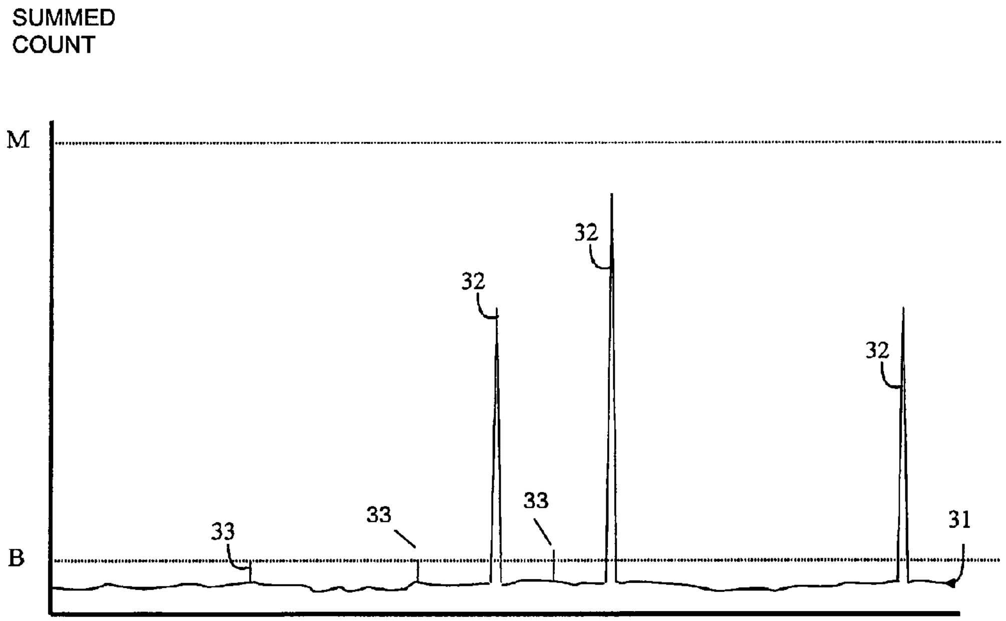
FIG. 2 illustrates a typical spectrum generated by a time of flight mass spectrometer in accordance with the principles of the present invention.

FIG. 2 illustrates a typical mass spectrum that might be output from a TOF MS. It is a graph of abundance of ions on the vertical axis (which could be represented in a number of ways, such as number of ions or ion concentration) as a function of m/z on the horizontal axis (which also could be represented several ways, such as ion mass, time of flight, or even particular analyte if the expected constituents of the sample are well defined and previously known.) Thus, FIG. 2 shows a mass spectrum in which the sample contained significant concentrations of three different analytes, as represented by the three large peaks 32, and smaller concentrations of three other analytes, as represented by smaller peaks 33, on a relatively low background 31. The m/z of the ions represented by the peaks 32 and 33 are known by their position on the horizontal axis and their relative concentrations are known by the heights of the peaks.

As previously noted, the lower the concentration of an analyte of interest, the greater the number of transient measurements that should be made to achieve a desired signal to noise ratio. Typically, the number of transients that are summed for a TOF MS experiment is set to correspond to the worst-case scenario, i.e., the lowest expected concentration of an analyte of interest. The concentration of an analyte of interest can vary significantly over a series of successive transient measurements. Thus, the variation in the optimal number of transients per spectrum in TOF MS can be significant. As previously noted, a number of transients on the order of hundreds to tens of thousands per scan would not be unusual in a conventional TOF MS system. Obviously, the greater the number of transients needed to generate a spectrum, the longer it takes to generate a mass spectrum (i.e., the lower the spectral rate of the system). However, also as previously noted, it is desirable to maximize the spectral rate of the system since the input sample typically is time-variant, and the longer the interval between spectra, the lower the probability that transiently present species may be resolved and detected.

In accordance with the principles of the present invention, the number of transients taken to generate a spectrum is data dependent. The time required to generate a spectrum can be significantly reduced (and the spectral rate can be significantly increased) during periods of high information content and can be reduced during periods of low information content. Hence, the spectral rate of TOF MS and the amount of data stored, collected, and/or processed per experiment can be dynamically optimized.

As noted above, in prior art TOF MS systems, the number of transients measured (and therefore the amount of time required) per spectrum was a function of the lowest expected concentration of an analyte of interest. Particularly, the number of transients taken per spectrum had to be large enough to detect a statistically significant number of impacts of ions of the lowest concentration desired to be accurately detectable.

In accordance with the principles of the present invention, on the other hand, the controller 9 keeps track of a relevant characteristic of the collected data that is indicative of the quality or accuracy of the data as the data is being collected and stops the collection of transients (i.e., the scan) when that characteristic reaches a predetermined threshold value. For instance, after the data for each transient is collected and summed with the cumulative data of the previous transients, the selected signal characteristic is calculated and compared to a threshold for that characteristic. If that threshold is not met, then the system takes another transient and repeats the process. If, on the other hand, the threshold is met, the scan is halted and a mass spectrum is generated from the summed data of all of the transients. In one embodiment of the invention, the calculation of the characteristic and comparison to the threshold is conducted in parallel with the continuing collection of transients. Therefore, one or more transients may be collected after the threshold is met but before it is determined that the threshold was met. Preferably, these transients are kept and used in generating the spectrum since there normally would be no reason to throw them out. In another embodiment of the invention, the characteristic calculation and comparison to the threshold need not be performed after every transient is collected. For instance, it may be performed every 10 or 20 transients.

The characteristic of the data used in this comparison can be any characteristic reasonably indicative of the quality of the data. Therefore, any value reasonably representative of signal to noise ratio would be a good choice. For instance, the characteristic may be the total number of ions detected (e.g., the integrated ion current) in one or more mass ranges. One may select a single mass range of interest or a plurality of mass ranges of interest and, for each such range, select a minimum integrated ion current threshold that must be exceeded to halt the collection of transients. The mass range or ranges may be so small as to correspond to a single ion mass or even a single time bin (e.g., a single memory address in memory 19). Alternately, each mass range may correspond to a plurality of adjacent time bins (e.g., a plurality of adjacent memory addresses) or even the entire mass spectrum of interest for the sample. The value(s) stored in the memory address(es) corresponding to a mass range represent(s) the integrated ion current corresponding to that time range.

In one embodiment of the invention, the characteristic can be as simple as a running sum of all of the data points (e.g., the sum of the values stored in all of the memory addresses in memory 19 corresponding to the mass range). This sum essentially would be directly indicative of the total number of ion impacts detected by the detector up to that point in time for that spectrum acquisition.

In another embodiment, the characteristic is the height of the tallest peak (commonly termed the base peak) in the mass range. In a simple embodiment, one could use the highest value stored in any of the relevant memory locations in the memory 19 to represent the base peak. In a slightly more complicated version, it can be represented by the sum of the values stored in a selected number of adjacent memory locations.

In yet another embodiment of the invention, the characteristic is the height of a peak corresponding to a particular analyte expected in the sample. Again, this number could be represented quite simply by the value stored in the particular memory location in the memory 19 corresponding to the mass of that ion. Alternately, it could be represented by a predetermined number of adjacent memory locations corresponding to the mass of that ion.

In one embodiment of the invention, the threshold is made noise dependent. For instance, an initial threshold ion current could be preset or selected by an operator. Further, the system could continuously measure average background noise, such as by determining the detector output during one or more time bins where there should be no analytes. Then the threshold value to be used during operation could be set to the sum of the initial threshold and the background noise.

Although not a requirement, an important consideration is to keep the characteristic computationally simple so that it can, for example, be generated in real time after the data from each transient is collected and summed before the next transient measurement begins. All of the aforementioned exemplary characteristics, are easy to generate and are reasonable approximate predictors of signal-to-noise ratio.

In other embodiments of the invention, the characteristic can actually be a calculated signal-to-noise ratio for the data collected up to that point in time. There are any number of well known formulae for estimating or calculating the signal-to-noise ratio of a mass spectrum, some of which are relatively computationally simple. Any of these techniques could be used to calculate a signal-to-noise ratio and to halt the measurement when that signal-to-noise ratio exceeds a predetermined threshold.

Whatever characteristic is selected, it usually will be desirable to generate the characteristic from the data with minimal latency as well as actually terminate the collection of data with minimal latency. There are any number of steps that can be taken to minimize these latencies, such as performing the operations as close as reasonably possible to the data acquisition level, performing the calculations with hardware rather than software, and/or using a characteristic that is computationally simple to generate.

The threshold could be operator selectable or could be preset. The system also could be designed to permit the user to select a particular signal characteristic and/or threshold that he or she wishes to use for this purpose.

In an embodiment of the invention, a maximum and a minimum number of transients per spectrum is enforced. Specifically, during periods where there are no or few ions, as might often be the case when the TOF MS is the second stage of a system having another, preceding MS stage in which the sample incoming to the TOF MS is already time separated, a maximum number of transients per spectrum should be enforced. Otherwise, the spectral rate may drop to an unacceptably low rate. Specifically, as previously alluded to, the peaks in the output from a preceding separation stage, such as a gas or liquid chromatograph, might contain peaks that are seconds to a few minutes wide separated by nulls that are as long as many minutes. A maximum number of transients per spectrum should be enforced to assure that the spectral rate does not drop below some reasonable rate such as one every 1-10 seconds.

On the other hand, a very noisy sample could fool the system into terminating the collection of transients prematurely. For instance, the TOF baseline could drift and erroneously trigger the threshold before a reasonable number of transients have been collected. Therefore, a minimum number of transients per spectrum also should be enforced to help guarantee that every spectrum has useful information. That minimum number could be set as a function of the expected concentrations of ions or a minimum concentration that the user deems worthy of note. This number might commonly be on the order of about 100-1,000 transients.

The overall result is a higher spectral rate in areas of interest, a smaller total data set size, and/or a lower average transfer rate.

Since each spectrum generated by the TOF MS may be the result of a different number of transient responses, the intensities of the m/z peaks in each spectrum will not be normalized to each other. Therefore, it may be desirable to normalize the spectra relative to each other before generating a mass spectrum. The intensities may be normalized to each other in any reasonable manner. One simple technique would be to divide the intensities in each spectrum by the integration time to produce the spectrum or by the number of transients used to produce the spectrum.

Figure 3:
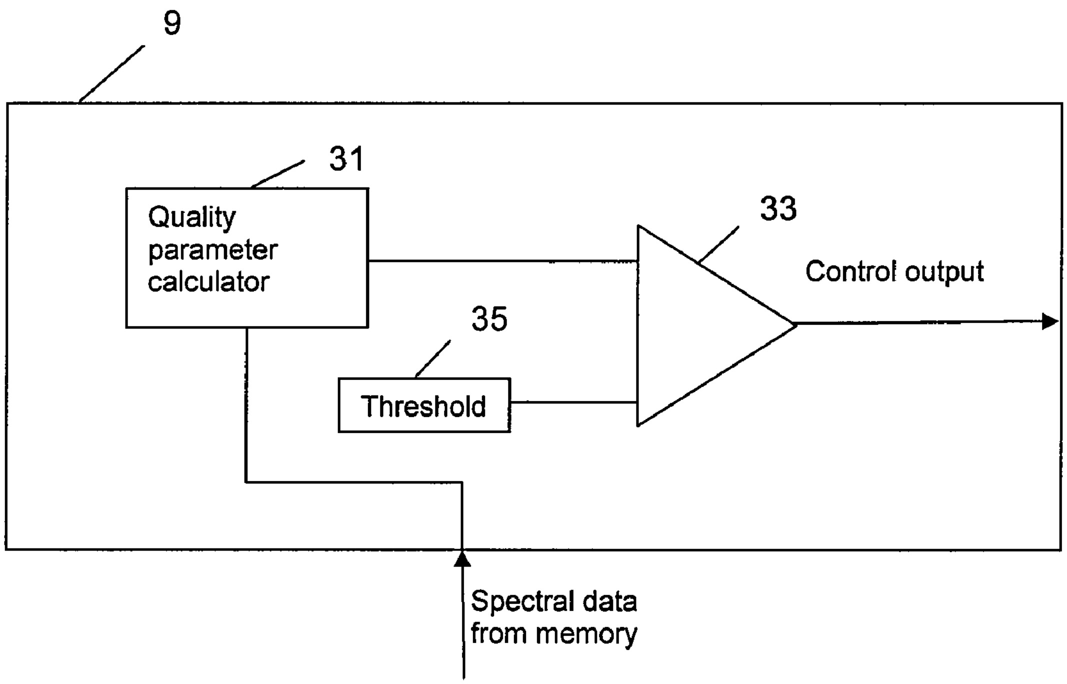
FIG. 3 is a block diagram illustrating portions of the controller of FIG. 1 for performing certain processes in accordance with one embodiment of the present invention.

FIG. 3 is a block diagram illustrating an exemplary embodiment of a portion of the controller 9 for determining when to halt the collection of transients for a mass spectrum. As shown, a quality parameter calculator module 41 reads the combined spectral data from the memory 19 at designated intervals, such as after each transient is recorded and combined. The quality parameter calculator 31 may be any circuit or the like for performing such an operation. For example, it may comprise an analog or digital circuit, a state machine, a processor, a microprocessor, an application specific integrated circuit, combinational logic, or it may be a software routine running on a processor or microprocessor. The quality parameter calculator module 31 calculates the quality parameter and outputs it to an input of a comparison circuit 33. Comparison circuit 33, for instance, is a comparator or a software routine. The comparison circuit 33 also receives the threshold value 35 to compare to the calculated quality parameter. If the calculated quality parameter meets the threshold requirement, the comparison circuit generates a control signal directing the other equipment to halt the collection of transients for that scan. The controller at this time also may cause the data to be read out from the memory and output as a mass spectrum, and resets the other equipment, such as the address counter and the memory.

Figure 4:
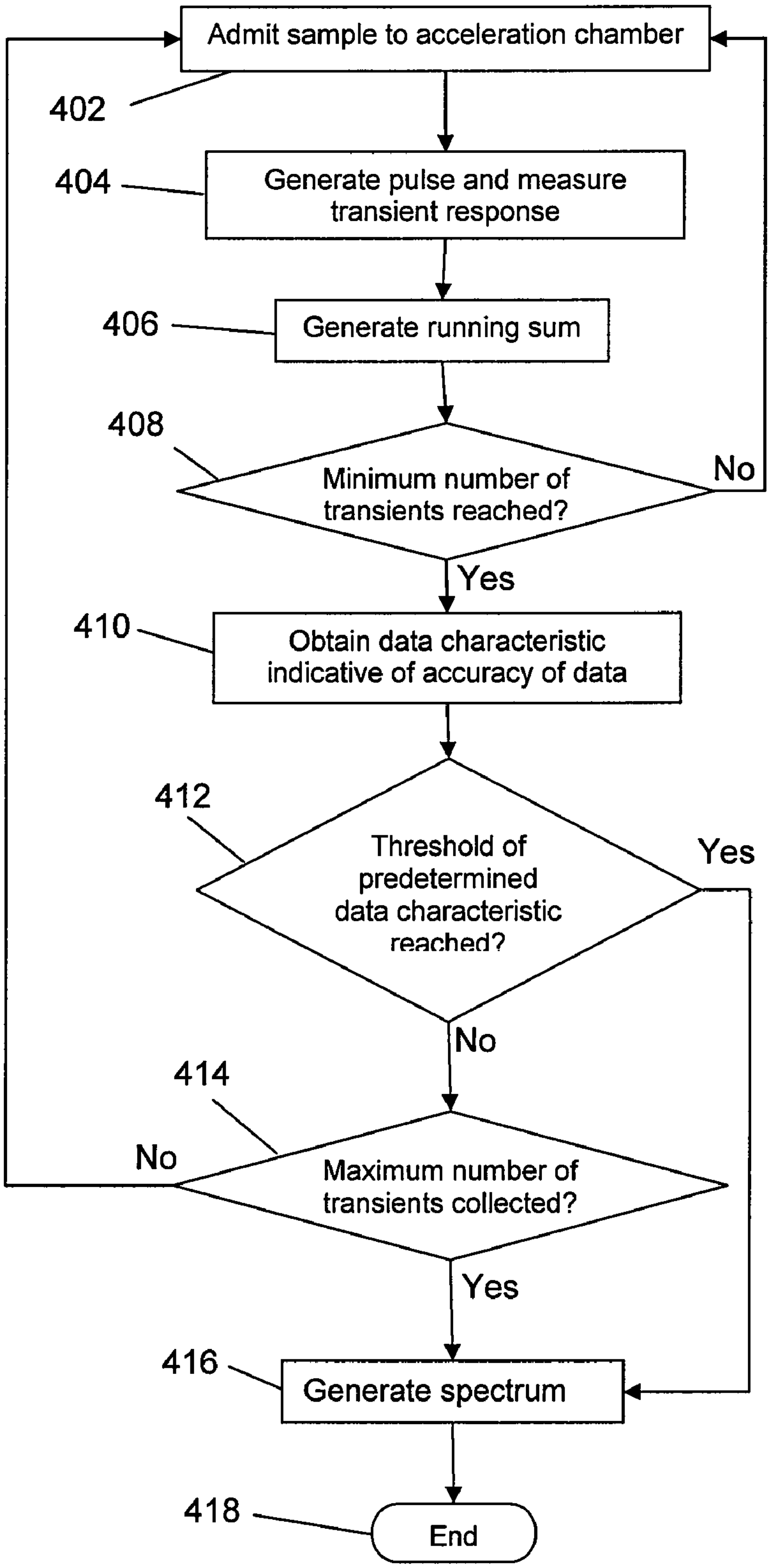
FIG. 4 is a flow chart showing an exemplary flow of data processing in accordance with one embodiment of the present invention.

FIG. 4 is a flow chart illustrating processing in accordance with one embodiment of the present invention. In step 402, a sample is admitted to the acceleration chamber. In step 404, a pulse is generated to accelerate ions toward the detector and the transient response is measured as previously described herein above in connection with FIG. 1. In step 406, the data is summed and stored also as hereinabove previously described. In step 408, it is determined if a minimum number of transients has been taken. If not, processing flows back to step 402 and another transient response is taken, summed with the previously collected data, and stored by repeating steps 402, 404, and 406. When the minimum number of transient responses is reached, flow will proceed to step 410. In step 410, the particular data characteristic that has been chosen for determining whether a sufficient number of transients have been collected is calculated or otherwise obtained. For instance, as noted above in connection with some of the exemplary data characteristics, it may not be necessary to perform any further calculation at all to obtain the data characteristic as it may be simply one of the values stored in one of the memory locations.

In step 412, that data characteristic is compared to the predetermined threshold value to determine if the threshold has been met. If so, no further transient responses are collected and, processing proceeds directly to step 416 where the spectrum is generated. If, however, the threshold has not been met, flow instead proceeds to step 414. In step 414, it is determined whether the predetermined maximum number of transients has been collected. If not, then flow returns to step 402 and another transient measurement is collected and processed in accordance with steps 402, 404, 406, 408, 410, 412, and 414. However, if it is determined in step 414 that the maximum number of transients has been collected, then the collection of transients is halted regardless of whether the threshold has been met and processing proceeds to step 416 where a spectrum is generated. The process ends at step 418.

TOF MS performed in accordance with the principles of the present invention should prove particularly useful in systems having a preceding MS stage with potentially long separation times between data peaks. In the current state-of-the-art, the spectral rate of TOF MS systems typically is set as a function of the time duration of the most transiently present component expected in the analysis separation. Particularly, the TOF MS spectral rate must be faster than this time duration (e.g., chromatographic peak width) to assure that a component will not be missed. Preferably, the spectral rate is less than half of the minimum possible component time duration (e.g., one half of the chromatographic peak width). However, in accordance with the principles of the present invention, the spectral acquisition rate can drop below this rate without significant negative implication to the measurements being made. Specifically, the spectral acquisition rate will be relatively higher during periods of high rates of ion impact and relatively lower during periods of low ion impact rate. Periods of low ion impact rate generally contain very little information, whereas periods of high ion impact rate generally contain significant information. The system will not miss components because the increased rate of ion impacts associated with the appearance of an incremental component (e.g., a new chromatographic peak) peak will cause the spectral acquisition rate to increase.

Having thus described a few particular embodiments of the invention, various alterations, modifications, and improvements will readily occur to those skilled in the art. Such alterations, modifications, and improvements as are made obvious by this disclosure are intended to be part of this description though not expressly stated herein, and are intended to be within the scope of the invention. Accordingly, the foregoing description is by way of example only, and not limiting. The invention is limited only as defined in the following claims and equivalents thereto.

We claim:

1. In a time of flight mass spectrometer, a method of performing time of flight mass spectrometry, the method comprising:

combining transient responses of an input sample, each transient response comprising counts of ion impacts in consecutive time periods, to generate combined spectral data;

determining a characteristic of the summed spectral data; and halting collection of transient responses in the time of flight mass spectrometer and generating a mass spectrum if a characteristic meets a predetermined threshold, wherein a rate of spectral acquisition increases when a rate of ion impact increases; wherein no more than a predetermined maximum transients per spectrum, and no more than a predetermined minimum transients per spectrum, are collected.

2. The method of claim 1 wherein the characteristic is a signal to noise ratio and the threshold is a minimum signal to noise ratio.

3. The method of claim 1 wherein the characteristic is a peak height and the threshold is a minimum base peak height.

4. The method of claim 1 wherein the input sample varies in time.

5. The method of claim 1 further comprising: generating the input sample by a preceding stage that separates the ion abundance in the input sample by time.

6. In a time of flight mass spectrometer, a method of performing time of flight mass spectrometry, the method comprising:

(a) generating spectral data of a transient response by the time of flight mass spectrometer, the spectral data corresponding to an input sample;

(b) combining the spectral data of the transient response with corresponding spectral data of preceding transient responses corresponding to the input sample to generate combined spectral data;

(c) determining a value of a characteristic of the combined spectral data representative of a quality of the combined spectral data;

(d) determining if the value of the characteristic meets a threshold; (e) repeating (a), (b), (c), and (d) if the value of the characteristic does not meet the threshold; (f) outputting the combined spectral data if the value of the characteristic meets the threshold, wherein: element (a) comprises accelerating ions from a sample toward a destination a plurality of times and detecting the times after the accelerations at which the ions arrive at the destination; and element (b) comprises generating summed spectral data by summing the number of ions arriving at the destination at particular delay ranges after the corresponding acceleration with the number of ions that arrived at the destination at corresponding delay ranges after the acceleration from preceding transient responses, and the method further comprises:

providing a second threshold comprising a maximum number of accelerations and detections; and if the first threshold is not met before the second threshold is met, outputting the mass spectrum when the second threshold is met.

7. The method of claim 6 wherein (f) further comprises normalizing the combined spectral data.

8. The method of claim 7 wherein normalizing comprises dividing the combined spectral data by a number of transient responses generated.

9. The method of claim 6 wherein the characteristic is a signal to noise ratio and the threshold is a minimum signal to noise ratio.

10. The method of claim 6 wherein the characteristic is a base peak height and the threshold is a minimum base peak height.

11. The method of claim 6 wherein the characteristic is a peak height corresponding to a particular mass-to-charge ratio and the threshold is a minimum peak height.

12. The method of claim 6 wherein the input sample varies in time.

13. The method of claim 12 further comprising: (g) generating the input sample by a preceding mass spectrometry stage.

14. The method of claim 12 further comprising: (g) generating the input sample by MALDI.

15. The method of claim 12 further comprising: (g) generating the input sample by chromatography.

16. The method of claim 6 wherein the input sample is separated in time by ion mass.

17. The method of claim 6 wherein outputting the mass spectrum comprises outputting the mass spectrum based on the summed spectral data if at least the characteristic meets the first threshold and a number of preceding accelerations and detections exceeds a third threshold.

18. The method of claim 6 wherein the characteristic is a signal to noise ratio.

19. The method of claim 6 wherein the characteristic is a cumulative number of ions that arrived at the destination.

20. The method of claim 19 wherein the characteristic is a cumulative number of ions that arrived at the destination during a particular time range after the acceleration.

21. A time of flight mass spectrometer comprising:

a pulse generator for generating pulses to accelerate ions from a first position toward a second position;

an ion detector for detecting ions as they arrive at the second position and generating transient responses comprising information as to numbers of ions arriving at the destination as a function of time after the pulses;

a circuit adapted to combine the transient response from each pulse with transient responses from previous pulses to produce combined spectral data; and a controller configured to determine a quality of the summed spectral data and to control the time of flight mass spectrometer to generate transient responses and summed spectral data until the quality of the summed spectral data meets a threshold, wherein no more than a predetermined maximum transients per spectrum, and no more than a predetermined minimum transients per spectrum, are collected.

22. A computer program product embodied in a computer readable medium readable by a computing system in a computing environment, for controlling a time of flight mass spectrometer, the computer program product comprising:

computer-readable program code for calculating a quality of combined spectral data received from a time of flight mass spectrometer, the combined spectral data comprising data of a plurality of transient responses of a sample, each transient response being representative of counts of ion impacts in consecutive time periods, wherein a rate of spectral acquisition increases when a rate of ion impact increases; and computer-readable program code for generating a control signal to halt the time of flight mass spectrometer from collecting further transient responses of said sample, and to generate a mass spectrum when the characteristic meets a predetermined threshold.

23. The computer program product of claim 22 wherein the computer-readable program code for calculating a quality of the combined spectral data comprises computer-readable program code for calculating a signal-to-noise ratio of the combined spectral data.

24. In a time of flight mass spectrometer, a method for controlling the time of flight mass spectrometer, the method comprising:

receiving combined spectral data from the time of flight mass spectrometer, the combined spectral data comprising data of a plurality of transient responses of a sample, each transient response being representative of counts of ion impacts in consecutive time periods;

determining a quality of the summed spectral data;

providing a first threshold;

providing a second threshold comprising a maximum number of accelerations and detections, and when the first threshold is not met before the second threshold is met, outputting the mass spectrum when the second threshold is met; and halting the time of flight mass spectrometer from collecting further transient responses of said sample when a characteristic meets a either the first threshold or the second threshold.

* * * * *

UNITED STATES PATENT AND TRADEMARK OFFICE

CERTIFICATE OF CORRECTION

PATENT NO. : 7,977,626 B2
APPLICATION NO. : 11/763021
DATED : July 12, 2011
INVENTOR(S) : August Jon Hidalgo et al.

It is certified that error appears in the above-identified patent and that said Letters Patent is hereby corrected as shown below:

In column 10, line 27, in Claim 5, delete "claim 1" and insert -- claim 4 --, therefor.

Signed and Sealed this
Ninth Day of April, 2013

Teresa Stanek Rea
*Acting Director of the United States Patent and Trademark Office*